United States Patent
Tsirkin

(10) Patent No.: US 11,150,929 B2
(45) Date of Patent: Oct. 19, 2021

(54) ENHANCED MEMORY MANAGEMENT FOR VIRTUAL MACHINES

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 175 days.

(21) Appl. No.: 15/991,257

(22) Filed: May 29, 2018

(65) Prior Publication Data

US 2019/0370044 A1    Dec. 5, 2019

(51) Int. Cl.
*G06F 9/455* (2018.01)
*G06F 12/1009* (2016.01)

(52) U.S. Cl.
CPC ...... *G06F 9/45558* (2013.01); *G06F 12/1009* (2013.01); *G06F 2009/45583* (2013.01)

(58) Field of Classification Search
CPC ....... G06F 12/1009; G06F 2009/45583; G06F 9/45558
See application file for complete search history.

(56) References Cited

U.S. PATENT DOCUMENTS

| | | | |
|---|---|---|---|
| 7,380,049 B2 * | 5/2008 | Rajagopal | G06F 12/1475 711/1 |
| 8,341,627 B2 | 12/2012 | Mohinder | |
| 8,694,738 B2 | 4/2014 | Bhattacharjee et al. | |
| 9,507,727 B2 | 11/2016 | Lutas | |
| 2009/0327575 A1 * | 12/2009 | Durham | G06F 12/145 711/6 |
| 2009/0327621 A1 * | 12/2009 | Kliot | G06F 12/0253 711/154 |
| 2013/0132690 A1 * | 5/2013 | Epstein | G06F 11/1451 711/159 |
| 2014/0281365 A1 * | 9/2014 | Mashey | G06F 3/0685 711/207 |
| 2015/0058580 A1 * | 2/2015 | Lagar Cavilla | G06F 9/45558 711/149 |
| 2016/0077975 A1 * | 3/2016 | Stabrawa | H04L 67/1097 711/209 |
| 2016/0239325 A1 * | 8/2016 | Tsirkin | G06F 9/5016 |
| 2016/0259720 A1 * | 9/2016 | Bak | G06F 9/461 |
| 2017/0228271 A1 | 8/2017 | Tsirkin | |
| 2017/0249458 A1 | 8/2017 | Tsirkin | |
| 2018/0032443 A1 * | 2/2018 | Kaplan | G06F 12/1027 |
| 2019/0034095 A1 * | 1/2019 | Singh | G06F 3/0613 |
| 2019/0073473 A1 * | 3/2019 | VanderLeest | G06F 21/6218 |

* cited by examiner

*Primary Examiner* — Jorge A Chu Joy-Davila
(74) *Attorney, Agent, or Firm* — Lowenstein Sandler LLP

(57) ABSTRACT

Aspects of the disclosure provide for mechanisms for memory management of virtual machines in a computer system. A method of the disclosure includes: releasing a memory page of a guest memory of a virtual machine; sending, by the virtual machine, a first notification to a hypervisor, the first notification comprising an indication that a memory page associated with the virtual machine is to be rendered inaccessible; and receiving, by the virtual machine, a second notification indicative of detection of an attempt to access the memory page.

18 Claims, 7 Drawing Sheets

200

| Identifier 211 | Access Status Parameter 213 | Host address 215 |
|---|---|---|
| Identifier 221 | Access Status Parameter 223 | Host address 225 |
| Identifier 231 | Access Status Parameter 233 | Host address 235 |

ENHANCED MEMORY MANAGEMENT FOR VIRTUAL MACHINES

TECHNICAL FIELD

The implementations of the disclosure generally relate to computer systems and, more specifically, to memory management in virtualized computer systems.

BACKGROUND

Virtualization allows multiplexing of an underlying host machine between different virtual machines. The host machine allocates a certain amount of its resources to each of the virtual machines. Each virtual machine is then able to use the allocated resources to execute applications, including operating systems (referred to as guest operating systems). An executable layer that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer. A host machine can accommodate more virtual machines than the size of its physical memory allows. Using virtual memory techniques, the host machine can give each virtual machine the impression that it has a contiguous an address space, while in fact the memory used by the virtual machine may be physically fragmented and even overflow to disk storage.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a schematic diagram of an example of a host page table in accordance with some implementations of the present disclosure;

DETAILED DESCRIPTION

Figure 1:
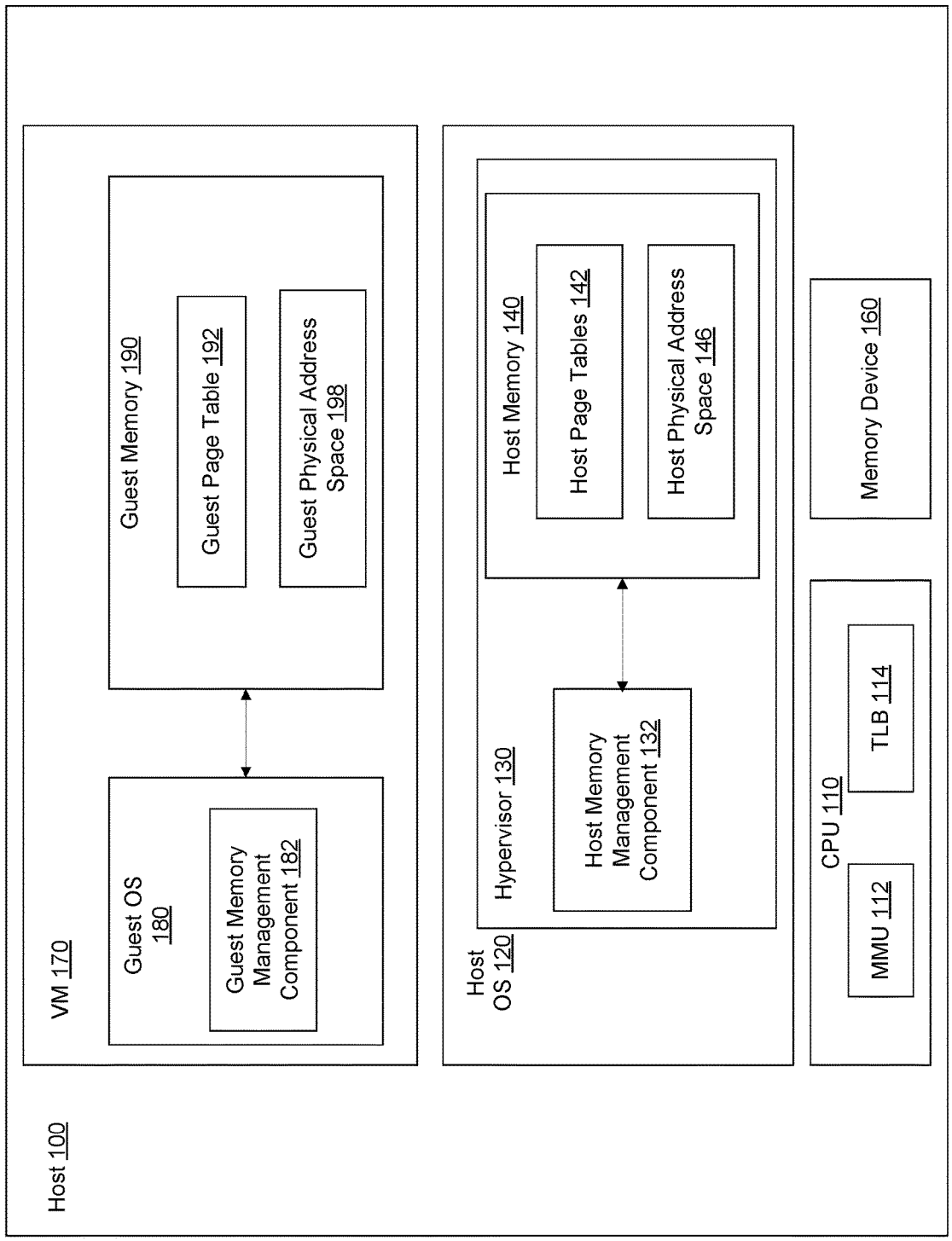
FIG. 1 is a block diagram of an example of a computer system in which implementations of the disclosure may operate.

Virtualized computer systems often include overlapping storage management features that manage the same underlying physical storage resources. For example, a hypervisor and a guest operating system may both include storage management features that implement a caching mechanism across different storage devices. The caching mechanism may involve memory pages that are paged to or from a persistent storage. The hypervisor and guest operating systems may function separately and a hypervisor may allocate storage to a virtual machine but may be unaware of which portions of storage are in use by a guest operating system executed by the virtual machine. Knowledge of the guest operating system's use of the storage may be beneficial to a hypervisor managing memory because portions of storage that have been released by the guest operating system may be reused by the hypervisor without the overhead of copying the data to and from persistent storage (e.g., paging). In one example, the guest operating system may interact with the hypervisor and provide free page hints that indicate which of the memory pages allocated to a virtual machine have been freed by the guest operating system.

Some operating systems may include data integrity features that break when the hypervisor reuses a memory page without copying the original content to and from persistent storage. The data integrity features may assign a unique value to data storage and subsequently check the data storage for the unique value to determine whether the data storage was improperly modified. The improper modification may be caused by multiple different sources, such as malicious code, a programming defect, a hardware error, other source, or a combination thereof. In one example, the operating system may include data integrity features that are referred to as page poisoning. Page poisoning may involve an operating system assigning a poison value (e.g., poison pattern) to a memory page when the memory page is freed. The operating system may subsequently check the poison pattern when the memory page is subsequently reallocated. If the poison pattern is not present, the operating system may determine the memory page was modified and provide a notification. The notification may enable the operating system, a debugger, other executable code, or a combination thereof to analyze the memory page to assist with identifying the cause of the modification. The data integrity features of a guest operating system may not function when using the free page hinting discussed above because the value assigned to a released memory page may be overwritten when the hypervisor reuses the page without the value (e.g., poison value) being paging to and from persistent storage.

Aspects of the present disclosure address the above and other deficiencies by providing mechanisms that enable enhanced memory protection and management for virtual machines using host page tables instead of page poisoning. For example, upon releasing a memory page of a guest memory by a guest operating system of a virtual machine, the virtual machine can transmit, to a hypervisor managing the virtual machine, a notification that the memory page is released and/or that the memory page is to be inaccessible. The virtual machine can also send, to the hypervisor, a request to notify the virtual machine of attempts to access the memory page and/or accesses to the memory page. The notification may include a guest virtual address, a guest physical address, and/or any other identifying information of the memory page. In view of the notification, the hypervisor can generate and/or modify a page table entry of a host page table to include an indication that the memory page is inaccessible. For example, the hypervisor can locate a page table entry of the host page table that is associated with the memory in view of the identifying information of the memory page. The hypervisor can then mark the page table entry as invalid to indicate that the memory page is inaccessible (e.g., "write-protected," "non-present," etc.). As such, attempts to access the memory page may cause a page fault.

Upon detecting that the virtual machine or any other device attempts to access the memory page, the hypervisor can report the detection of such attempt (e.g., in view of the request to notify the virtual machine of accesses to the memory page). For example, the hypervisor can abort the virtual machine (e.g., by executing a virtual machine exit). As another example, the hypervisor can notify the virtual machine of the detection of the attempt to access the memory page (e.g., by sending an interrupt or any other notification). In one implementation, the virtual machine can notify the hypervisor to render the memory page accessible (e.g., by marking the page table entry as "valid") to use the memory page. In another implementation, the hypervisor can render the memory page accessible in view of the detection of the attempt to access the memory page. The virtual machine may receive the notification indicating the detection of the attempt to access the memory and skip the notification. The virtual machine can then use the memory page The systems and methods described herein include technology that enhances virtualization technology for a computer system. In particular, aspects of the present disclosure provide technology that enhances the security, reliability, efficiency, and/or performance of memory management in a virtualized computer system. The technology may enable enhanced memory protection for virtual machines using host page tables instead of page poisoning. Compared to conventional page poisoning techniques, the mechanisms disclosed herein may perform memory protection for a virtual machine without initialization of released pages with poisoning patterns. This may allow the mechanisms to catch more accesses to inaccessible memory pages of a virtual machine (e.g., released memory pages), making the virtual machine more robust. In addition, the mechanisms described herein may enhance the ability a computer system to determine a cause of an improper modification and may enhance the security of the computer system when the cause of the modification is due to malicious code and may enhance the reliability of the computer system when the cause of the modification is due to flaws in the executable code or underlying hardware.

Various aspects of the above referenced methods and systems are described in details herein below by way of examples, rather than by way of limitation. The examples provided below discuss a virtualized computer system that has a hypervisor without an underlying host operating system (e.g., bare metal hypervisor), but other examples may include a hypervisor and host operating system (not shown).

FIG. 1 is a block diagram of an example of a computer system 100 in which implementations of the disclosure may operate. FIG. 1 is a block diagram of an example of a host computer system 100 according to some embodiments of the present disclosure. The computing system 100 may be a server, a workstation, a personal computer (PC), a mobile phone, a palm-sized computing device, a personal digital assistant (PDA), etc. "Computer system" as used herein may be and/or include a system comprising one or more processors, one or more memory devices, and one or more input/output (I/O) interfaces.

As illustrated, host computer system 100 may include one or more processors 110 (e.g., host central processing units (CPUs)) communicatively coupled to memory devices 160. Local connections within host computer system 100, including connections between processors 110 and memory devices 160, may be provided by one or more local buses (not shown) of a suitable architecture.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some embodiments.

"Memory device" herein may be and/or include a volatile or non-volatile memory device, such as RAM (random-access memory), ROM (read-only memory), EEPROM (electrically erasable programmable read-only memory), or any other device capable of storing data.

"I/O device" herein may be and/or include a device capable of providing an interface between a processor and an external device capable of inputting and/or outputting binary data.

"Network interface controller" (NIC) herein may be and/or include a computer hardware component that connects a computer to a computer network. An NIC may include electronic circuitry required to communicate with other networked devices using specific physical layer and data link layer standards.

The processing device 110 may include a memory management unit (MMU) 112 and a translation lookaside buffer 114. The memory management unit 112 may be computer hardware that performs translations of virtual memory addresses to physical addresses of the memory device 160. Although depicted as integrated on the processing device 110, the MMU 112 may be a separate integrated circuit. The MMU 112 may use page tables that contain page table entries (e.g., one per page) that map virtual pages (e.g., guest virtual addresses) to physical pages (e.g., host physical addresses) in main memory. The TLB 114 is a cache of page table entries that may be used to avoid accessing main memory each time a virtual address is accessed. The processing device 110 may perform page table walks to locate any page table setup in the virtual machine 170 and the hypervisor 130 to use in the MMU 112 and to cache in the TLB 114.

As illustrated in FIG. 1, host computer system 100 may execute (run) one or more virtual machines 170 by executing a software layer 130, often referred to as "hypervisor," above the hardware and below the virtual machines. In certain implementations, hypervisor 130 may be a component of operating system 120 executed by the corresponding host computer system 100. Alternatively, hypervisor 130 may be provided by an application running under host operating system 120, or may run directly on the corresponding host computer system 120 without an operating system beneath it. Hypervisor 130 may abstract the physical layer, including processors, memory, I/O devices, etc. and present this abstraction to virtual machines 170 as virtual devices, including virtual processors, virtual memory, virtual I/O devices, etc. A hypervisor 130 may abstract the physical layer and present this abstraction to virtual machines 170 to use, by providing interfaces between the underlying hardware and virtual devices of virtual machines.

The hypervisor 130 may include a host memory management component 132 and a host memory 140. The host paging agent 132 may be implemented in computer instructions and executable by one or more processing devices 110. The host memory management component 132 may perform memory management for one or more virtual machines running on host 100 (e.g., by performing one or more operations described in connection with FIGS. 3-6).

The host memory 140 may include a host physical address space 146 that maintains host physical addresses (HPAs) of the memory device 160. The host memory 140 may also include one or more host page tables 142. The host page tables 142 may include mappings of guest physical addresses (GPAs) to the HPAs (actual memory of the memory device 160). In one implementation, the host page tables 142 may translate guest physical addresses to host physical addresses. In another implementation, the host page tables 142 may translate guest virtual addresses to host physical addresses. Each of the host page tables 142 can include a plurality of page table entries. Each of the page table entries may be associated with a memory page of guest memory 190 and may comprise a mapping of a guest address of the memory page (e.g., a guest virtual address, a guest physical address, etc.) to a host physical address.

The virtual machine 170 may be referred to as guest 170 interchangeably herein. The virtual machine 170 may include a guest operation system 180 and a guest memory 190. The virtual machine 170 may execute the guest operating system 180 to manage its resources. The virtual machine 170 may run the same or different guest operating system than the host OS 120, such as Microsoft Windows®, Linux®, Solaris®, Mac® OS, etc. The guest OS 180 may execute a guest memory management component 182 and one or more guest applications (e.g., any suitable application such as word processing, spreadsheet, calendar, web browser, calculator, email, etc.). The guest memory management component may manage aspects of the guest memory 190, such as the allocation and the release of portions of guest memory 190.

Guest memory 190 may be any virtual memory, logical memory, physical memory, other portion of memory, or a combination thereof for storing, organizing, or accessing data. Guest memory 190 may represent a portion of memory that is designated by hypervisor 130 for use by the virtual machine 170. Guest memory 190 may be managed by guest operating system 112A-C and may be segmented into memory pages. Each of the memory pages may include a contiguous or non-contiguous sequence of bytes or bits and may have a page size that is the same or different from a memory page size used by hypervisor 130. In one example, the memory pages may correspond to memory blocks of a volatile or non-volatile memory device and may each correspond to an individual memory block, multiple memory blocks, or a portion of a memory block. Each of the memory pages may have a standard size (e.g., page size of 4 KB) or an enlarged size (e.g., page size of 2 MB), which may be referred to as "huge pages."

As the guest operating system 180 executes, it may release one or more guest memory pages and may transmit an indication to the hypervisor 130 to indicate the release of the memory pages. Releasing the memory page may involve the guest operating system 180 instructing the virtual machine 170 to execute a release operation that is the same or similar to freeing, deallocating, dereferencing, deleting, removing, moving, other operation, or a combination thereof. In one example, a release operation may be initiated by the guest operating system in response to being notified that a memory page is no longer in use. This may occur when a process managed by the guest operating system makes a system call to the guest operating system to free the memory page. In another example, a release operation may be initiated by the guest operating system in response to determining the memory page is no longer in use by a process or thread managed by the guest operating system (e.g., garbage collection). In either example, releasing a memory page may result in the memory page being available for reuse by the guest operating system while remaining allocated to the virtual machine executing the guest operating system.

The guest operating system 180 may maintain a page table hierarchy comprising a page directory and a set of page tables to facilitate the translation of virtual addresses into physical addresses. For example, the guest memory 190 may include a guest physical address space 198, and one or more guest page tables 192. The guest physical address space 198 may include a first contiguous portion that is allocated for the virtual machine 170 and mapped to the memory device 160 (e.g., random access memory (RAM)). The first portion may include a large amount of memory, such as 1 gigabyte, 1 terabyte, etc. The first portion may begin at address 0 and end at whichever address represents its size (e.g., 1 GB, 1 TB, etc.). The guest physical address space 198 also includes other portions that have higher addresses than the first portion allocated to the virtual machine. These portions may be unused by the virtual machine 170 (e.g., they may be free space in the guest physical address space 198). These other portions may be referred to as guest intermediate addresses (GIAs) herein. Further, the GIAs may be part of a subspace in the guest physical address space 198. The subspace may be referred to as the guest intermediate address space herein. The guest page tables 192 may map guest virtual addresses (GVAs) to GPAs in the guest physical address space 198 allocated for the virtual machine 170.

As an example, a guest application being executed by the guest operating system 180 (not shown) may reference memory locations using GVAs. Responsive to receiving a memory access request, the processing device 110 may translate the referenced GVA to a GPA using the guest page table 192 that is managed by the guest operating system 180. The processing device 110 may then translate the GPA to the corresponding HPA using the host page table 142 that is managed by the hypervisor 130. An extended page table pointer (EPTP) field of a virtual machine control structure (VMCS) (not shown) may hold the physical address of the host page table 142.

In some embodiments, the host memory management component 132 and/or the guest memory management component 182 may perform various operations discussed herein with reference to FIGS. 3-6 that improve the performance of memory management by the processing device 110. For example, upon releasing a memory page of the guest memory 190 by the guest OS 180, the guest memory management component 182 can transmit, to the host memory management component 132, a notification that the memory page is released and/or that the memory page is to be rendered inaccessible. The notification may include a guest virtual address, a guest physical address, and/or any other identifying information of the memory page. The notification may also include a request to notify the virtual machine of attempts to access the memory page and/or accesses to the memory page. The notification may include, for example, a hypercall. The host memory management component 132 can then generate and/or modify a page table entry of a host page table 142 to include an indication that the memory page is inaccessible. For example, the host memory management component 132 can locate the page table entry of the host page table 142 associated with the memory in view of the identifying information of the memory page. The host memory management component 132 can then define a parameter of the page table entry to indicate that the page table entry is invalid and/or that the memory page is inaccessible (e.g., "write-protected," "non-present," etc.). As such, attempts to access the memory page may cause a page fault.

When the host memory management component 132 detects that the virtual machine 170 or any other device attempts to access the memory page, the host memory management component 132 can report the detection of such attempt. For example, the host memory management component 132 can abort the virtual machine 170. As another example, the host memory management component 132 can notify the guest memory management component 182 of the detection of the attempt to access the memory page (e.g., by sending an interrupt or any other notification). In one implementation, the guest memory management component 182 can notify the host memory management component 132 to render the memory page accessible (e.g., by marking the page table entry associated with the memory page as "valid") to use the memory page. In another implementation, the host memory management component 132 can render the memory page accessible in view of the detection of the attempt to access the memory page. The virtual machine 170 can then use the memory page.

FIG. 2 schematically illustrates an example 200 of a host page table in accordance with some implementations of the present disclosure. The host page table 200 may include any suitable data structure that can be used to map guest addresses (e.g., guest virtual addresses, guest physical address, etc.) to host addresses (e.g., host physical addresses). As illustrated, the host page table 200 may include one or more page table entries (e.g., page table entries 210, 220, and 230). Each of the page table entries may correspond to a memory page of a virtual memory or a physical memory that can be identified by an identifier (e.g., identifier 211, 221, 231). The identifier may be, for example, a guest address (e.g., a guest virtual address or a guest physical address) associated with the memory page.

As illustrated, each of the page table entries may also include a parameter (e.g., access status parameters 213, 223, and 233) that indicates an access status of a memory page corresponding to a page table entry. For example, a first value of the parameter (e.g., "0" or any other value) may indicate that the memory page is inaccessible and/or that the page table entry is invalid. The memory page may be regarded as being inaccessible when the memory page is write-protected, not present, etc. As another example, a second value of the parameter (e.g., "1" or any other value) may indicate that the memory page is accessible and/or that the page table entry is valid. The memory page may be regarded as being accessible when the memory page is writable, executable, etc.

Figure 3:
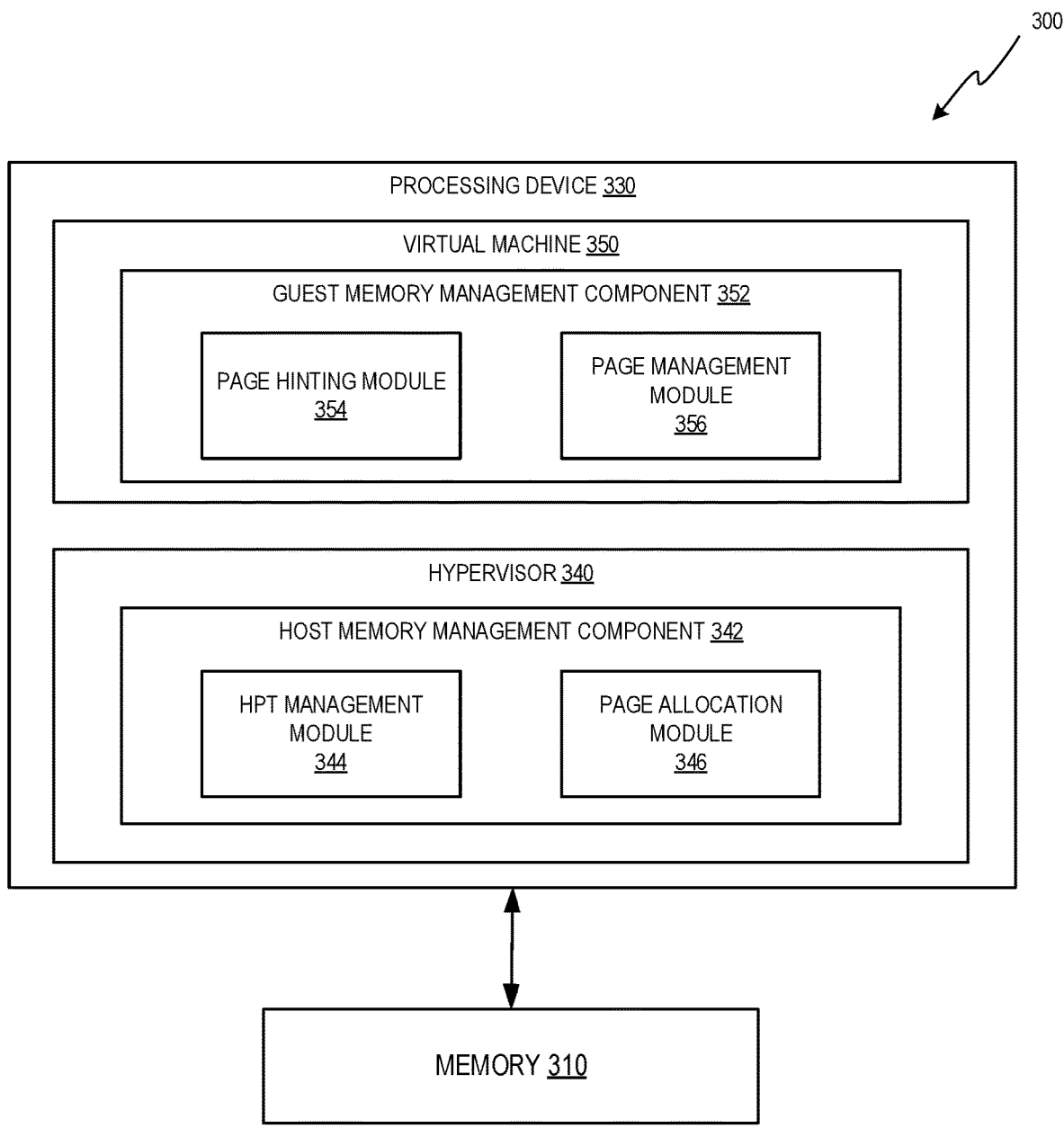
FIG. 3 illustrates an example computing device in which implementations of the disclosure may operate.

FIG. 3 illustrates an example computing device 300 in which implementations of the disclosure may operate. Computing device 300 may be the same or similar to the host computer system 100 described with respect to FIG. 1. Computing device 300 may include components and modules for firmware validation for encrypted VMs. The computing device 300 may include a memory 310 that can store VM memory pages. In one implementation, the VM memory pages may be memory (e.g., a page cache) of computing device 300 virtualized for use by VM 350.

Computing device 300 may include a processing device 330 with a hypervisor 340 and a VM 350. The hypervisor 340 may be the same as or similar to the hypervisor 130 as described in connection with FIG. 1 in some embodiments. The VM 350 may the same as or similar to the VM 170 as described in connection with FIG. 1 in some embodiments. As illustrated in FIG. 3, the hypervisor 340 can include a memory management component 342 that can manage memory usage of one or more virtual machines running on the processing device 330. The memory management component 342 may include a VM management module 344, a host page table (HPT) management module 346, and a page allocation module 348. The VM 350 may include a memory management component 352 that can manage memory usage of the VM 350. The memory management component 352 may include a page protection module 354, a notification module 356, and a page management module 358.

Page hinting module 354 may enable the VM 350 to indicate to the hypervisor 340 memory pages of a guest memory of the VM 350 that are released, allocated, or a combination thereof. In one example, page hinting module 354 may record the status of memory pages by updating a set of guest memory pages that have been released. Page hinting module 354 may provide the set to the hypervisor using one or more notifications. For example, page hinting module 354 can send, to the hypervisor 340, a notification that a memory page assigned to the VM 350 is released by a guest OS of the VM 350 (also referred to as the first "notification"). In some embodiments, the first notification may further include a guest address associated with the memory page, such as a guest virtual address, a guest physical address, etc. The first notification may be sent before, during, or after the memory page is released by the guest OS. The first notification may include identification data of the released memory page. The identification data may include, for example, a guest address associated with the memory page or any other information that can identify the memory page. In some embodiments, the first notification comprises a request to notify the virtual machine of attempts to access the memory page and/or accesses to the memory page. As such, the VM 350 may be notified of any attempt to access the memory page.

The page hinting module 354 can send the first notification to the hypervisor 340 in some embodiments. In one implementation, the first notification may correspond to a system call, hypercall, other function call, or a combination thereof that is initiated by the guest OS of the VM 350. As another example, the page hinting module 354 may send the first notification by storing the notification in a memory that is accessible to the hypervisor 340 (e.g., also referred to the "shared memory"). The hypervisor 340 may then retrieve the first notification from the shared memory.

The HPT management module 344 can manage memory usage of one or more virtual machines running on the processing devices 330 by managing one or more host page tables (e.g., host page tables 142 of FIG. 1 and/or host page tables 200 of FIG. 2). The HPT management module 344 may determine that the memory page is to be rendered inaccessible in view of the first notification. The HPT management module 344 can generate and/or modify a page table entry of a host page table to indicate that the memory page is inaccessible. For example, the HPT management module 344 can locate, in view of the guest address of the memory page, a page table entry of the host page table that is associated with the memory page. The located page table entry may include a mapping of the guest address to a host physical address. The HPT management module 344 can then mark the page table entry associated with the memory page as invalid to indicate that the memory page is inaccessible. In some embodiments, the HPT management module 344 can define a parameter of the page table entry (e.g., an access status parameter 213, 223, 233) to indicate that the memory page is inaccessible (e.g., by assigning, to the parameter, a first value indicative of inaccessibility of the memory page). As the memory page is marked as inaccessible, attempts to access the memory page may result in a page fault.

In some embodiments, the page protection module 346 may detect an attempt to access the memory page by the VM 350 (e.g., the guest OS of the VM 350) or any other device. The attempt to access may be detected by listening for page faults or in any other suitable manner. The page allocation module 346 may determine that the memory page is inaccessible in view of the access status parameter of the page table entry associated with the memory page (e.g., by determining that the value of the access status parameter is the first value).

The page protection module 346 can report the detection of the memory access request. In one implementation, the page protection module 346 may abort the VM 350 (e.g., by executing a VM exit). In another implementation, the page protection module 346 can send, to the VM 350, a notification indicating the detection of the attempt to access the memory page (also referred to as the "second notification"). For example, the second notification may be an interrupt, message, exception, any other signal indicating the detection of the attempt to access the memory page, or a combination thereof. As another example, the page protection module 346 may store the second notification in the shared memory. The VM 350 can then retrieve the second notification from the shared memory.

In some embodiments, the HPT management module 344 may render the memory page accessible, for example, by modifying the access status parameter to indicate that the memory page is accessible and/or that the memory page entry is valid (e.g., by setting the value of the access status parameter to a second value). In one implementation, the HPT management module 344 can render the memory page accessible in view of the detection of the attempt to access the memory page. In another implementation, the HPT management module 344 can render the memory page accessible in response to receiving a request to render the memory page accessible from the VM 350. As the memory page is modified as being accessible, access to the memory page may be permitted. For example, the page allocation module 346 may receive a request to allocate one or more portions of the memory page to the VM 350 (e.g., from the page management module 356). The page allocation module 346 can determine that the memory page is accessible in view of the access status parameter (e.g., by determining that the value of the access status parameter is the second value). The page allocation module 346 can then allocate the requested portion(s) of the memory page to the VM 350.

In some embodiments, the page management module 358 may receive the second notification indicative of the attempt to access the memory page and can determine whether the memory access request is originated from the VM 350 (e.g., whether the request is made by the guest OS of the VM 350, an application running on the VM 350, etc.). In one implementation, the page management module 358 may generate a request to render the memory page accessible in response to determining that the memory access request is originated from the VM 350. The page management module 358 may transmit the request to the hypervisor 340 (e.g., by making a hypercall). As discussed above, the HPT management module 344 can render the memory page accessible in response to receiving the request. In another implementation, the HPT management module 344 may render the memory page accessible in view of the detection of the attempt to access the memory page as described above. The page management module 358 can ignore the second notification and can access one or more portions of the memory page (e.g., for executing a process, an application, etc.).

Figure 4:
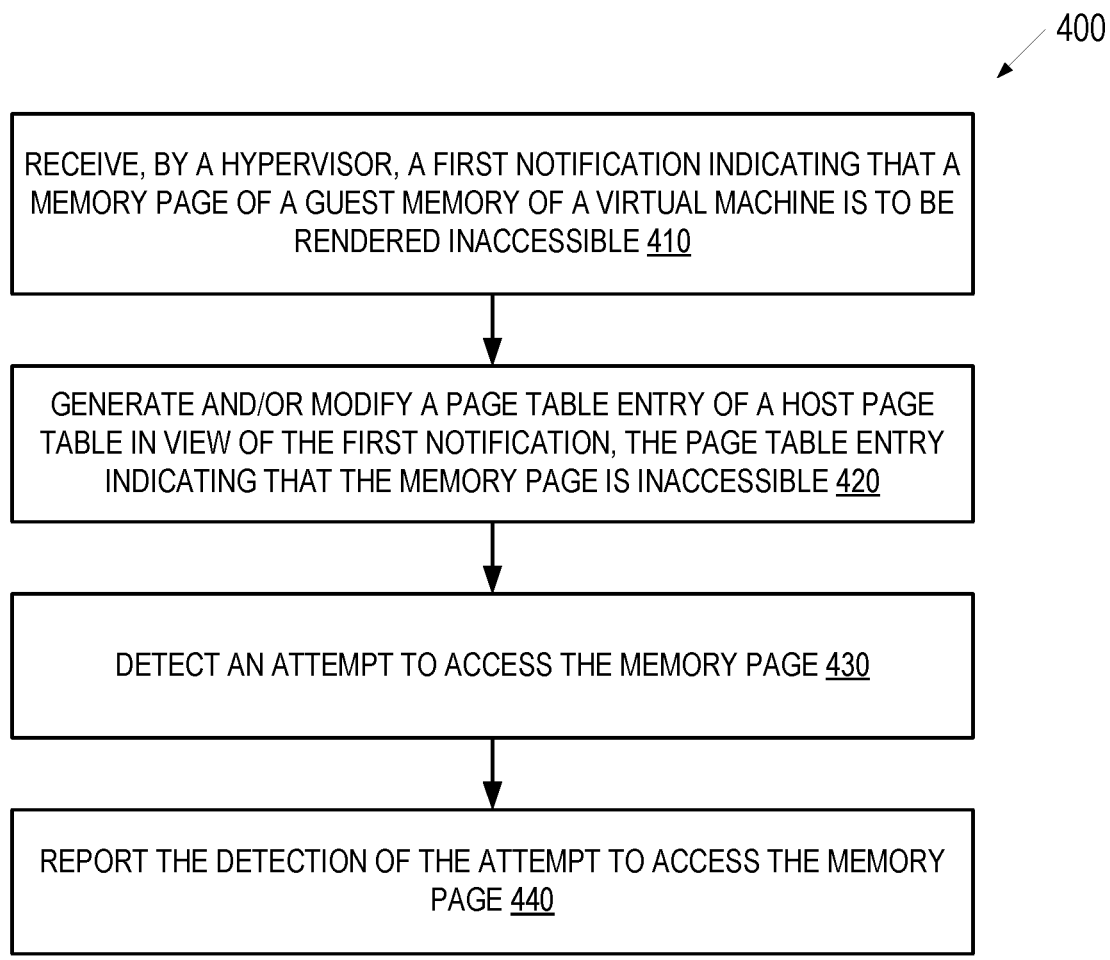
FIG. 4 is a flow diagram illustrating an example process for managing memory usage of a virtual machine in accordance with some embodiments of the present disclosure.
Figure 5:
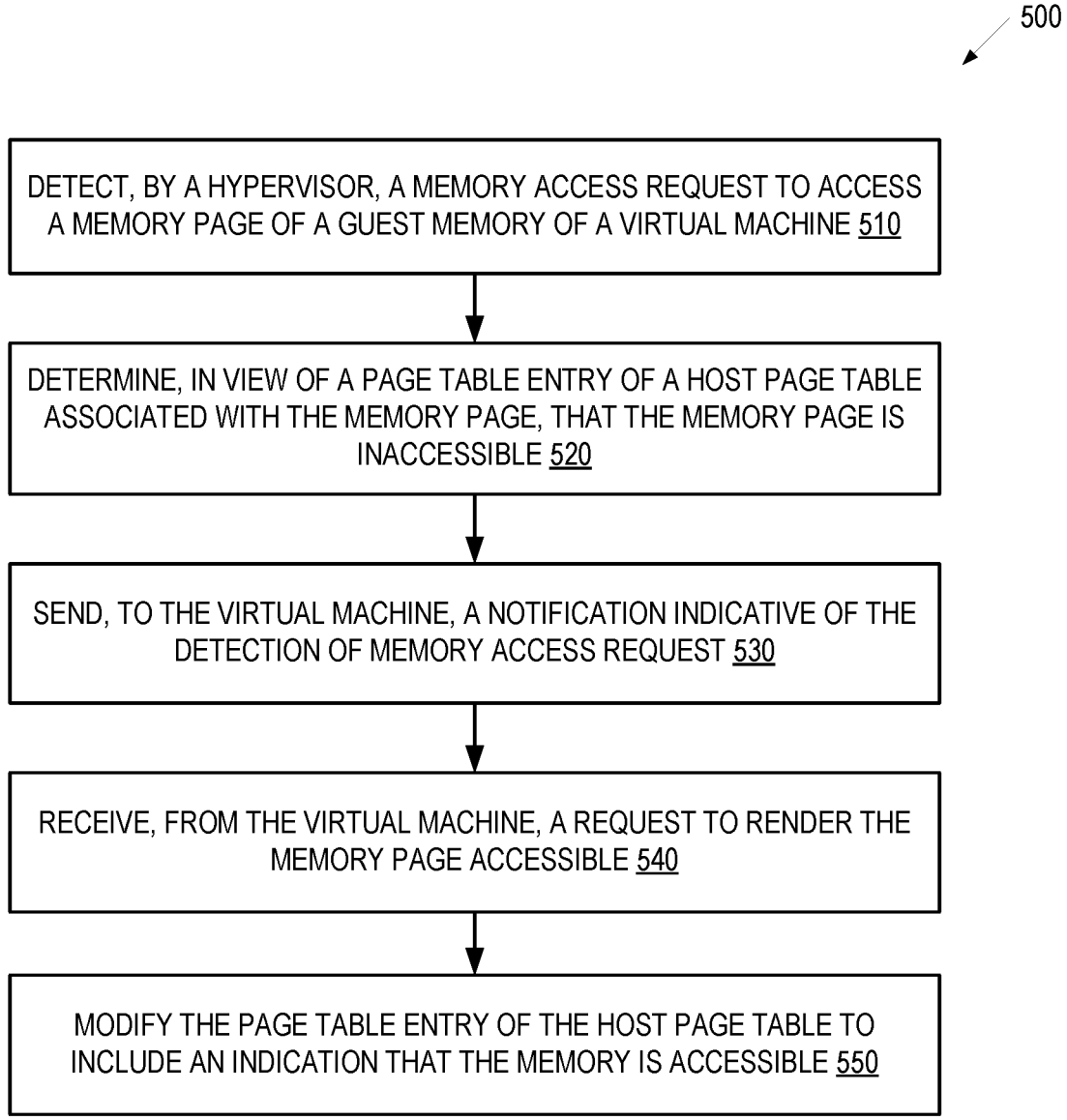
FIG. 5 is a flow diagram illustrating an example process for data integrity verification in accordance with some embodiments of the present disclosure.
Figure 6:
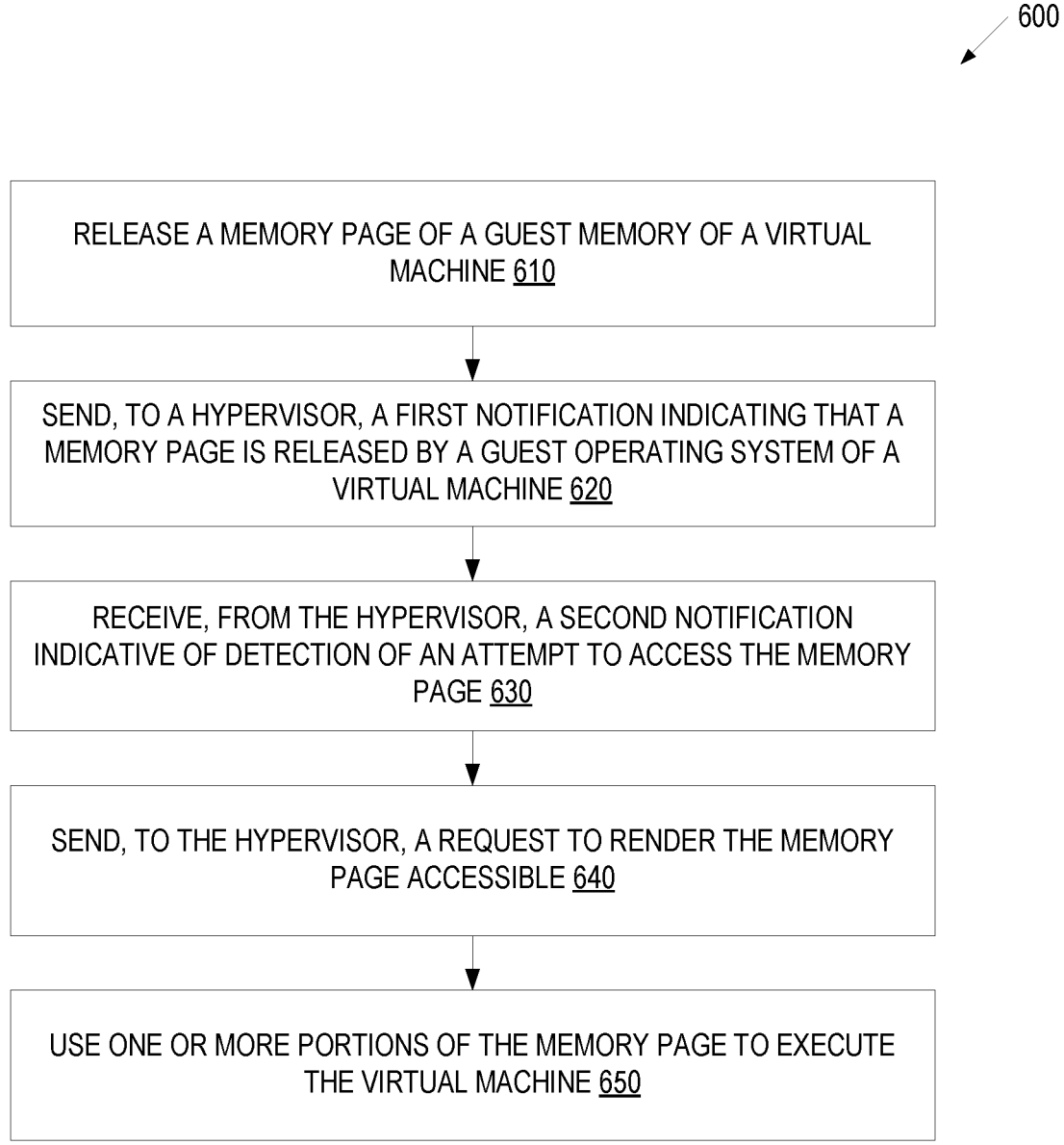
FIG. 6 is a flow diagram illustrating an example process for memory management by a virtual machine in accordance with some embodiments of the present disclosure.

FIGS. 4, 5, and 6 are flow diagrams illustrating methods 400, 500, and 600 for memory management in a virtualized computer system in accordance with one or more aspects of the present disclosure. Method 400 illustrates an example process for managing memory usage of a virtual machine in accordance with some embodiments of the present disclosure. Method 500 illustrates an example process for data integrity verification in accordance with some embodiments of the present disclosure. Method 600 illustrates an example process for memory management by a virtual machine in accordance with some embodiments of the present disclosure. Methods 400, 500, and 600 may be performed by processing devices that may comprise hardware (e.g., circuitry, dedicated logic, programmable logic, microcode, etc.), executable code (such as is run on a general purpose computer system or a dedicated machine), or a combination of both. Methods 400, 500, and 600 and each of their individual functions, routines, subroutines, or operations may be performed by one or more processors of the computer device executing the method. In certain implementations, methods 400, 500, and 600 may each be performed by a single processing thread. Alternatively, methods 400, 500, and 600 may be performed by two or more processing threads, each thread executing one or more individual functions, routines, subroutines, or operations of the method. In an illustrative example, the processing threads implementing methods 400, 500, and 600 may be synchronized (e.g., using semaphores, critical sections, and/or other thread synchronization mechanisms). Alternatively, the processes implementing methods 400, 500, and 600 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 400, 500, and 600 may be performed by computer system 100 as shown in FIG. 1.

Referring to FIG. 4, method 400 may start when a hypervisor receives, from a virtual machine, a first notification indicating that a memory page associated with the virtual machine is to be rendered inaccessible at block 410. The memory page may be a memory page of a guest memory of the virtual machine. The first notification may include, for example, an indication that the memory page is to be released or freed by a guest operating system of the virtual machine, an indication that the memory page is not to be used by the virtual machine, and/or any other information that may indicate that the memory page is to be rendered inaccessible. In some embodiments, the first notification may include identification data that can be used to identify the memory page. For example, the identification may include a guest address associated with the memory page (e.g., a guest virtual address, a guest physical address, etc.). In some embodiments, the first notification comprises a request to notify the virtual machine of attempts to access the memory page and/or accesses to the memory page. As such, the virtual machine may be notified of any attempt to access the memory page.

At block 420, the hypervisor can generate and/or modify a page table entry of a host page table in view of the first notification. For example, the hypervisor can locate the page table entry that maps the guest address to a host physical address. The hypervisor can further mark the page table entry as invalid to indicate that the memory page is inaccessible (e.g., by defining a parameter of the page table entry to indicate that the memory page is write-protected (e.g., read-only), non-present, etc.).

At block 430, the hypervisor can detect an attempt to access the memory page. The hypervisor can detect that the VM or any other device attempts to access the memory page. The attempt may be detected, for example, by listening for a page fault related to the memory page.

At block 440, the hypervisor can report the detection of the attempt to access the memory page. For example, the hypervisor can abort the virtual machine (e.g., by executing a VM exit). As another example, the hypervisor can send, to the virtual machine, a notification indicative of the detection of the attempt to access the memory page (also referred to as the "second notification"). In one implementation, the hypervisor can send the second notification by sending an interrupt. In another implementation, the hypervisor can send the second notification by storing the second notification in a memory accessible to the virtual machine. The virtual machine can then retrieve the second notification from the memory.

Referring to FIG. 5, method 500 may start when a hypervisor detects an attempt to access a memory page associated with a virtual machine at block 510. The memory page may be a memory page of a guest memory of the virtual machine. The memory access request can include a request to access one or more portions of the memory page. The memory access request can be made by the virtual machine (e.g., by a guest OS of the virtual machine) and/or any other device.

At block 520, the hypervisor can determine, in view of a page table entry of a host page table associated with the memory page, that the memory page is inaccessible. For example, the hypervisor can determine that a parameter of the page table entry indicates that the memory page is inaccessible (e.g., by determining that a value of the parameter is "0" or any other value indicative of inaccessibility of the memory page).

At block 530, the hypervisor can send, to the virtual machine, a notification indicative of the detection of the memory access request. In one implementation, the hypervisor may send an interrupt to the virtual machine. In another implementation, the hypervisor can send the notification by storing the notification in a memory accessible to a virtual machine related to the memory page. The virtual machine can then retrieve the notification from the memory. In some embodiments, the hypervisor can also execute a virtual machine exit or abort the virtual machine in any other suitable manner in response to detecting the memory access request.

At block 540, the hypervisor can receive, from the virtual machine, a request to render the memory page accessible. The request to render the memory page accessible may include a request to permit access to the memory page. The request may include a hypercall in some embodiments. In some embodiments, block 540 may be omitted.

At block 550, the hypervisor can modify the page table entry of the host page table to include an indication that the memory is accessible. For example, the hypervisor can modify the parameter of the page table to indicate that the memory page is accessible (e.g., by setting the value of the parameter to "1" or any other suitable value indicative of accessibility of the memory page). In one implementation, the hypervisor can modify the page table entry to indicate that the memory page is accessible in view of the detection of the memory access request. In another implementation, the hypervisor can modify the page table entry to indicate that the memory page is accessible in response to receiving the request to render the memory page accessible at block 540.

Referring to FIG. 6, method 600 may start when a virtual machine releases a memory page of a guest memory of the virtual machine at block 610. Releasing the memory page may involve a guest operating system instructing the virtual machine to execute a release operation that is the same or similar to freeing, deallocating, dereferencing, deleting, removing, moving, other operation, or a combination thereof.

At block 620, the virtual machine may send, to a hypervisor, a first notification indicating that a memory page associated with the virtual machine is to be rendered inaccessible. The memory page may be a memory page of a guest memory of the virtual machine. The first notification may include an indication that the memory page is released by a guest operating system of the virtual machine, an indication that the memory page is not to be used by the virtual machine, etc. The first notification can include a hypercall in some embodiments. In some embodiments, the first notification comprises a request to notify the virtual machine of attempts to access the memory page and/or accesses to the memory page. The virtual machine may thus be notified of any attempt to access the memory page.

At block 630, the virtual machine can receive, from the hypervisor, a second notification indicative of detection of an attempt to access the memory page. In one implementation, the second notification may include an interrupt. In another implementation, the virtual machine can retrieve the second notification from a shared memory that is accessible to the hypervisor and the virtual machine.

At block 640, the virtual machine can send, to the hypervisor, a request to render the memory page accessible (e.g., via a hypercall or in any other suitable manner). The request to render the memory page accessible may include any request to grant access to the memory page. In some embodiments, the virtual machine can send the request to render the memory page accessible in response to determining that the attempt to access the memory page was made by the virtual machine (e.g., by the guest OS). Alternatively or additionally, the virtual machine may send the request to render the memory page accessible in view of the second notification (e.g., upon receiving the second notification). In some embodiments, block 640 may be omitted.

At block 650, one or more portions of the memory page may be used to execute the virtual machine by a processing device executing the virtual machine. For example, the portion(s) of the memory page may be allocated to the virtual machine for executing an application, a process, etc. and/or performing any other function of the virtual machine. In some embodiments, the virtual machine may send, to the hypervisor, a request to allocate the portion(s) of the memory page. The hypervisor may allocate the portion(s) of the memory page to the virtual machine.

Figure 7:
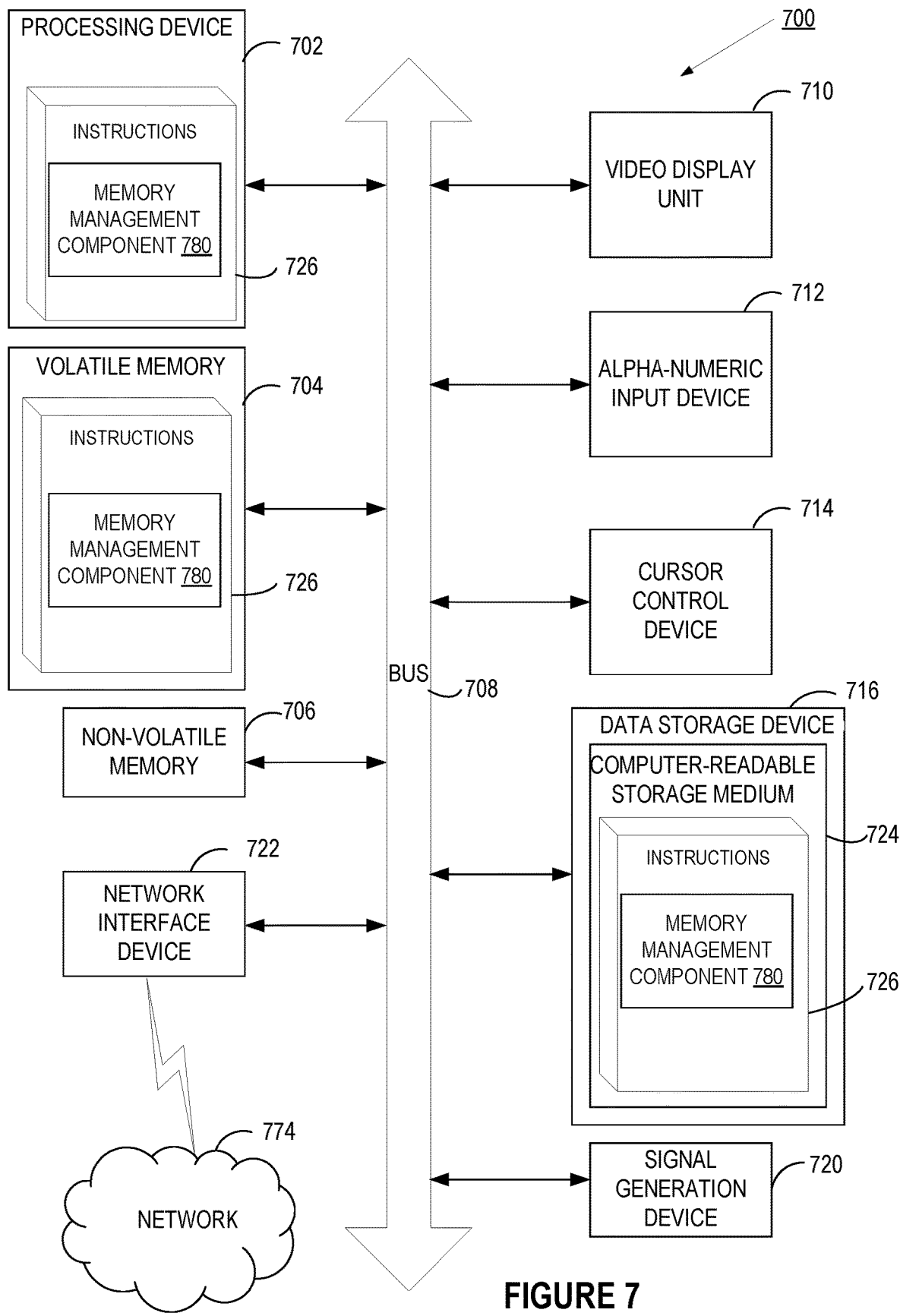
FIG. 7 illustrates a block diagram of one implementation of a computer system.

FIG. 7 depicts a block diagram of a computer system operating in accordance with one or more aspects of the disclosure. In various illustrative examples, computer system 700 may correspond to a computing device, such as computer system 700 of FIG. 1. The computer system may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alpha-numeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for a memory management component 780. The memory management component 780 may be a guest memory management component and/or a host memory management component of FIGS. 1 and 3 for implementing methods 400, 500 and/or 600 of FIGS. 4, 5, and 6.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Other computer system designs and configurations may also be suitable to implement the system and methods described herein. The following examples illustrate various implementations in accordance with one or more aspects of the present disclosure.

Example 1 is a method comprising: receiving, by a processing device running a hypervisor, a first notification indicating that a memory page associated with a virtual machine is to be rendered inaccessible, wherein the first notification comprises a request to notify the virtual machine of attempts to access the memory page; modifying a page table entry of a host page table to include an indication that the memory page is inaccessible; detecting, by the hypervisor, an attempt to access the memory page; and reporting, by the hypervisor, the attempt to access the memory page.

Example 2 includes the subject matter of example 1, wherein reporting the detection of the attempt to access the memory page comprises aborting the virtual machine.

Example 3 includes the subject matter of example 1, wherein reporting the detection of the attempt to access the memory page comprises sending, to the virtual machine, a second notification indicative of the detection of the attempt to access the memory page.

Example 4 includes the subject matter of example 3, wherein sending the second notification comprises sending an interrupt.

Example 5 includes the subject matter of example 1, further comprising: in view of the detection of the attempt to access the memory page, modifying, by the hypervisor, the page table entry to indicate that the memory page is accessible.

Example 6 includes the subject matter of example 1, wherein the first notification indicates that the memory page is released by a guest operating system of the virtual machine.

Example 7 includes the subject matter of example 1, wherein the first notification comprises a guest address associated with the memory page.

Example 8 includes the subject matter of example 7, wherein the guest address comprises at least one of a guest virtual address or a guest physical address.

Example 9 includes the subject matter of example 7, wherein the page table entry comprises a mapping of the guest address to a host physical address.

Example 10 is a method including detecting, by a hypervisor, a request to access a memory page associated with a virtual machine; determining, in view of a page table entry of a host page table associated with the memory page, that the memory page is inaccessible; sending, to the virtual machine, a notification indicative of the detection of the request to access the memory page; and modifying, by the hypervisor, the page table entry of the host page table to include an indication that the memory is accessible.

Example 11 includes the subject matter of example 10, wherein the notification comprises an interrupt.

Example 12 includes the subject matter of example 10, wherein sending, to the virtual machine, the notification indicative of the detection of the request to access the memory page comprises storing the notification in a memory accessible to the virtual machine.

Example 13 includes the subject matter of example 10, wherein determining, in view of the page table entry of the host page table associated with the memory page, that the memory page is inaccessible comprises determining that a parameter of the page table entry indicates that the memory page is inaccessible.

Example 14 includes the subject matter of example 13, wherein the parameter of the page table entry indicates that the memory page is write-protected or non-present.

Example 15 includes the subject matter of example 13, wherein modifying the page table entry comprises modifying the parameter of the page table to indicate that the memory page is accessible.

Example 16 includes the subject matter of example 10, further comprising executing a virtual machine exit in response to detecting the request to access the memory page.

Example 17 includes the subject matter of example 10, wherein the page table entry comprises a mapping of a guest address associated with the memory page to a host physical address.

Example 18 includes the subject matter of example 16, wherein the guest address comprises at least one of a guest virtual address or a guest physical address associated with the memory page.

Example 19 includes the subject matter of example 10, further comprising receiving, by the hypervisor, a request to allocate at least one portion of the memory page to the virtual machine; and allocating, by the hypervisor, the at least one portion of the memory page to the virtual machine.

Example 20 includes the subject matter of example 10, wherein the host page table is located at a host memory of the processing device.

Example 21 includes the subject matter of example 10, wherein the host page table comprises a plurality of page table entries that map a plurality of guest addresses to a plurality of host addresses.

Example 22 includes the subject matter of example 10, wherein the host page table comprises a plurality of page table entries that map a plurality of guest addresses to a plurality of host addresses.

Example 23 is method comprising: releasing a memory page of a guest memory of a virtual machine; sending, by a virtual machine, a first notification to a hypervisor, the first notification comprising an indication that a memory page associated with the virtual machine is to be rendered inaccessible, wherein the first notification comprises a request to notify the virtual machine of attempts to access the memory page; receiving, by the virtual machine, a second notification indicative of detection of an attempt to access the memory page; and using, by a processing device, at least a portion of the memory page to execute the virtual machine after receiving the second notification.

Example 24 includes the subject matter of example 23, further comprising: sending, to the hypervisor, a request to render the memory page accessible by the virtual machine.

Example 25 includes the subject matter of example 24, further comprising: sending the request to render the memory page accessible in view of the second notification.

Example 26 includes the subject matter of example 24, further comprising: sending the request to render the memory page accessible in response to determining that the attempt to access the memory page was made by the virtual machine.

Example 27 includes the subject matter of example 23, wherein the first notification comprises an indication that the memory page is released by a guest operating system of the virtual machine.

Example 28 includes the subject matter of example 23, wherein the first notification comprises a guest address associated with the memory page.

Example 29 includes the subject matter of example 28, wherein the guest address comprises a guest virtual address or a guest physical address.

Example 30 includes the subject matter of example 23, wherein the memory page is released by a guest operating system of the virtual machine.

Example 31 is an apparatus comprising a processing device; and means for receiving a first notification indicating that a memory page associated with a virtual machine is to be rendered inaccessible; means for generating a page table entry of a host page table including an indication that the memory page is inaccessible; means for detecting an attempt to access the memory page; and means for reporting the attempt to access the memory page.

Example 32 includes the subject matter of example 31, further including the subject matter of any of examples of 1-30.

Example 33 is a system comprising: a memory; and a processing device operatively coupled to the memory, the processing device to implement the subject matter of any of examples 1-32.

Example 34 is a non-transitory machine-readable storage medium including instructions that, when accessed by a processing device, cause the processing device to implement the subject matter of any of examples 1-32.

Unless specifically stated otherwise, terms such as "receiving," "invoking," "associating," "providing," "storing," "performing," "utilizing," "deleting," "initiating," "marking," "generating," "determining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 500, and 600 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
    releasing, by a virtual machine, a memory page of a guest memory of the virtual machine;
    responsive to releasing the memory page, sending, by a guest memory management component (GMMC) of the virtual machine, a first notification to a host memory management component (HMMC) of a hypervisor managing the virtual machine, the first notification comprising an indication that the memory page associated with the virtual machine is to be rendered inaccessible, wherein the first notification further comprises a request to notify the virtual machine of attempts to access the memory page;
    responsive to receiving the first notification from the virtual machine, marking, by the HMMC of the hypervisor, the memory page as invalid by modifying a page table entry of a host page table, wherein the host page table is located in a host memory of the hypervisor, and wherein the host page table entry is associated with the memory page;
    receiving, by the GMMC of the virtual machine, a second notification indicative of detection by the HMMC of an attempt to access the memory page by the virtual machine; and
    responsive to receiving, by the GMMC, the second notification indicative of detection of the attempt to access the memory page by the virtual machine:
        sending, by the GMMC of the virtual machine to the HMMC of the hypervisor, a third notification comprising an indication that the memory page associated with the virtual machine is to be marked as valid, and
        allocating at least a portion of the memory page to the virtual machine, wherein the memory page is marked as valid by the HMMC.

2. The method of claim 1, further comprising:
    sending, to the hypervisor, a request to render the memory page accessible by the virtual machine.

3. The method of claim 2, further comprising: sending the request to render the memory page accessible in view of the second notification.

4. The method of claim 2, further comprising: sending the request to render the memory page accessible in response to determining that the attempt to access the memory page was made by the virtual machine.

5. The method of claim 1, wherein the first notification comprises an indication that the memory page is released by a guest operating system of the virtual machine.

6. The method of claim 1, wherein the first notification comprises a guest address associated with the memory page.

7. The method of claim 6, wherein the guest address comprises a guest virtual address or a guest physical address.

8. The method of claim 1, wherein the memory page is released by a guest operating system of the virtual machine.

9. A system comprising:
    a memory; and
    a processing device operatively coupled to the memory, the processing device to:
    release a memory page of a guest memory of a virtual machine;
    responsive to releasing the memory page, send, by a guest memory management component (GMMC) of the virtual machine, a first notification to a host memory management component (HMMC) of a hypervisor managing the virtual machine, the first notification comprising an indication that the memory page associated with the virtual machine is to be rendered inaccessible, wherein the first notification further comprises a request to notify the virtual machine of attempts to access the memory page;
    responsive to receiving the first notification from the virtual machine, mark, by the HMMC of the hypervisor, the memory page as invalid by modifying a page table entry of a host page table, wherein the host page table is located in a host memory of the hypervisor, and wherein the host page table entry is associated with the memory page;
    receive, by the GMMC of the virtual machine, a second notification indicative of detection of an attempt to access the memory page by the virtual machine; and
    responsive to receiving the second notification indicative of detection of the attempt to access the memory page by the virtual machine:
        send, by the GMMC of the virtual machine to the HMMC of the hypervisor, a third notification comprising an indication that the memory page associated with the virtual machine is to be marked as valid, and allocate at least a portion of the memory page to the virtual machine, wherein the memory page is marked as valid by the HMMC.

10. The system of claim 9, wherein the processing device is further to:
send, to the hypervisor, a request to render the memory page accessible by the virtual machine.

11. The system of claim 10, wherein the processing device is further to: send the request to render the memory page accessible in view of the second notification.

12. The system of claim 10, wherein the processing device is further to: send the request to render the memory page accessible in response to determining that the attempt to access the memory page was made by the virtual machine.

13. The system of claim 9, wherein the first notification comprises an indication that the memory page is released by a guest operating system of the virtual machine.

14. The system of claim 9, wherein the first notification comprises a guest address associated with the memory page.

15. The system of claim 14, wherein the guest address comprises a guest virtual address or a guest physical address.

16. The system of claim 9, wherein the memory page is released by a guest operating system of the virtual machine.

17. A non-transitory machine-readable storage medium including instructions that, when accessed by a processing device, cause the processing device to:

release a memory page of a guest memory of a virtual machine;

responsive to releasing the memory page, send, by a guest memory management component (GMMC) of the virtual machine, a first notification to a host memory management component (HMMC) of a hypervisor managing the virtual machine, the first notification comprising an indication that the memory page associated with the virtual machine is to be rendered inaccessible, wherein the first notification further comprises a request to notify the virtual machine of attempts to access the memory page;

responsive to receiving the first notification from the virtual machine, mark, by the HMMC of the hypervisor, the memory page as invalid by modifying a page table entry of a hos page table, wherein the host page table is located in a host memory of the hypervisor, and wherein the host page table entry is associated with the memory page;

receive, by the GMMC of the virtual machine, a second notification indicative of detection of an attempt to access the memory page by the virtual machine; and responsive to receiving the second notification indicative of detection of the attempt to access the memory page by the virtual machine:

send, by the GMMC of the virtual machine to the HMMC of the hypervisor, a third notification comprising an indication that the memory page associated with the virtual machine is to be marked as valid, and allocate at least a portion of the memory page to the virtual machine, wherein the memory page is marked as valid by the HMMC.

18. The non-transitory machine-readable storage medium of claim 17, wherein the processing device is further to:
send, to the hypervisor, a request to render the memory page accessible by the virtual machine.

* * * * *